US011948455B2

(12) United States Patent
Cross et al.

(10) Patent No.: US 11,948,455 B2
(45) Date of Patent: Apr. 2, 2024

(54) SYSTEMS AND METHODS FOR DETECTION OF TRAVELERS AT ROADWAY INTERSECTIONS

(71) Applicant: STC, Inc., McLeansboro, IL (US)

(72) Inventors: Brad Cross, McLeansboro, IL (US); Terry Fryar, Benton, IL (US); Nicholas Freed, Thompsonville, IL (US)

(73) Assignee: STC, Inc., McLeansboro, IL (US)

(*) Notice: Subject to any disclaimer, the term of this patent is extended or adjusted under 35 U.S.C. 154(b) by 0 days.

(21) Appl. No.: 17/410,221

(22) Filed: Aug. 24, 2021

(65) Prior Publication Data

US 2021/0383690 A1 Dec. 9, 2021

Related U.S. Application Data

(63) Continuation of application No. 16/871,475, filed on May 11, 2020, now Pat. No. 11,113,963, which is a (Continued)

(51) Int. Cl.
*H04N 5/44* (2011.01)
*G08G 1/005* (2006.01)
(Continued)

(52) U.S. Cl.
CPC ............... *G08G 1/07* (2013.01); *G08G 1/005* (2013.01); *G08G 1/056* (2013.01); *G08G 1/087* (2013.01)

(58) Field of Classification Search
CPC .......... G08G 1/07; G08G 1/005; G08G 1/056; G08G 1/087
See application file for complete search history.

(56) References Cited

U.S. PATENT DOCUMENTS 4,321,589 A 3/1982 King
5,929,787 A 7/1999 Mee et al.
(Continued)

FOREIGN PATENT DOCUMENTS

JP 2004030082 A * 1/2004
JP 2004030082 A 1/2004
(Continued)

OTHER PUBLICATIONS

Applied Information, Inc. Webpage for Digital Media Kit, http://appinfoinc.com/newsroom/digital-media-kit/, printed on May 22, 2018 (7 pages).
(Continued)

*Primary Examiner* — Munear T Akki
(74) *Attorney, Agent, or Firm* — Lewis Rice LLC

(57) ABSTRACT

A system and method that enables individual travelers, including pedestrians or individuals on smaller conveyances, to communicate their location and direction of travel to signal light controllers at an intersection, enables traffic networks to receive this communication and output the detected data to the corresponding intersection traffic-signal controller to allow for individuals not in standard motor vehicles to be detected by traffic detection systems and to allow for priority of traveler flow either independent of vehicle use, or based on specifics of the vehicle used.

20 Claims, 4 Drawing Sheets

Related U.S. Application Data continuation of application No. 16/391,024, filed on Apr. 22, 2019, now Pat. No. 10,679,495, which is a continuation of application No. 15/921,443, filed on Mar. 14, 2018, now Pat. No. 10,311,725, which is a continuation-in-part of application No. 15/299,225, filed on Oct. 20, 2016, now Pat. No. 9,953,522.

(60) Provisional application No. 62/244,090, filed on Oct. 20, 2015.

(51) Int. Cl.

| | |
|---|---|
| ***G08G 1/056*** | (2006.01) |
| ***G08G 1/07*** | (2006.01) |
| ***G08G 1/087*** | (2006.01) |

(56) References Cited

U.S. PATENT DOCUMENTS

| | | | | |
|---|---|---|---|---|
| 6,064,319 | A * | 5/2000 | Matta | G08G 1/087 701/1 |
| 8,274,404 | B2 | 9/2012 | Sennett et al. | |
| 8,825,350 | B1 * | 9/2014 | Robinson | G08G 1/042 340/916 |
| 9,349,288 | B2 | 5/2016 | Raamot | |
| 9,558,666 | B2 | 1/2017 | Jasson et al. | |
| 9,953,522 | B2 | 4/2018 | Cross et al. | |
| 2001/0037174 | A1 | 11/2001 | Dickerson | |
| 2002/0065599 | A1 * | 5/2002 | Hameleers | G08G 1/09 701/117 |
| 2002/0126022 | A1 | 9/2002 | Ellis | |
| 2005/0128103 | A1 * | 6/2005 | Bachelder | G08G 1/087 340/906 |
| 2007/0069920 | A1 | 3/2007 | Hakki et al. | |
| 2009/0256721 | A1 * | 10/2009 | Glatfelter | G08G 1/01 340/928 |
| 2010/0309023 | A1 * | 12/2010 | Busch | G08G 1/07 340/917 |
| 2010/0325720 | A1 | 12/2010 | Etchegoyen | |
| 2011/0109478 | A1 * | 5/2011 | Williamson | G08G 1/087 340/906 |
| 2011/0187559 | A1 | 8/2011 | Applebaum | |
| 2011/0205086 | A1 * | 8/2011 | Lamprecht | G08G 1/08 340/928 |
| 2012/0229303 | A1 * | 9/2012 | Loffl | G08G 1/087 340/906 |
| 2013/0083722 | A1 | 4/2013 | Bhargava et al. | |
| 2013/0116915 | A1 * | 5/2013 | Ferreira | G08G 1/164 701/117 |
| 2013/0210460 | A1 | 8/2013 | Subramanian et al. | |
| 2014/0278029 | A1 * | 9/2014 | Tonguz | G08G 1/161 701/117 |
| 2015/0213713 | A1 * | 7/2015 | Taylor | G08G 1/0125 340/906 |
| 2016/0267787 | A1 | 9/2016 | Whitney et al. | |
| 2016/0292996 | A1 | 10/2016 | Kim et al. | |
| 2017/0148317 | A1 | 5/2017 | Diba | |
| 2018/0204451 | A1 | 7/2018 | Cross et al. | |
| 2020/0342760 | A1 | 10/2020 | Vassilovski et al. | |

FOREIGN PATENT DOCUMENTS

| | | | |
|---|---|---|---|
| JP | 2011186697 | A | 9/2011 |
| JP | 2012003602 | A | 1/2012 |
| JP | 2012155477 | A | 8/2012 |
| JP | 2014224715 | A | 12/2014 |

OTHER PUBLICATIONS

International Search Report, International Patent Application No. PCT/US2016/057954, dated Feb. 14, 2017 (9 pages).

International Search Report, International Patent Application No. PCT/US2019/022302, dated Jul. 2, 2019 (10 pages).

Tonguz, Ozan K., "Red Light, Green Light-No. Light." Spectrum IEEE. Oct. 24-29, 2018. Print. (6 pages).

TravelSafely Infographic, "How TravelSafely Works," by Applied Information, http://appinfoinc.com/wp-content/uploads/2017/09/TravelSafely-infographic.pdf, printed on Jun. 22, 2018 (1 page).

TravelSafely Brochure, "Connected Vehicle & Smart City Solutions, The future of connected vehicles is in your hands," Powered by Applied Information, http://appinfoinc.com/wp-content/uploads/2017/12/ts-brochure-1217.pdf, printed on May 22, 2018 (3 pages).

* cited by examiner

SYSTEMS AND METHODS FOR DETECTION OF TRAVELERS AT ROADWAY INTERSECTIONS

CROSS REFERENCE TO RELATED APPLICATION(S)

This Application is a continuation of U.S. patent application Ser. No. 16/871,475, filed on May 11, 2020, which is a continuation of U.S. patent application Ser. No. 16/391,024, filed on Apr. 22, 2019 and patented U.S. Pat. No. 10,679,495, which is a continuation of U.S. patent application Ser. No. 15/921,443, filed on Mar. 14, 2018 and patented as U.S. Pat. No. 10,311,725, which is a Continuation-In-Part (OP) of U.S. patent application Ser. No. 15/299,225, filed Oct. 20, 2016 and patented as U.S. Pat. No. 9,953,522, which claims the benefit of U.S. Provisional Patent Application No. 62/244,090, filed Oct. 20, 2015. The entire disclosure of all the above documents is incorporated herein by reference.

BACKGROUND

1. Field of the Invention

This disclosure is related to the field of systems for the management of traffic flow through the controlling of signal lights and detection of travelers within a traffic grid. Specifically, the system relates to providing personal detection systems to individuals to allow them to interact with controlled signal lights instead of having the lights interact with their vehicles.

2. Description of the Related Art

In the perfect urban commuter's utopia, signal lights would automatically switch to green every time a driver or pedestrian approached an intersection, creating an unobstructed pathway towards the individual's final destination regardless of the type of vehicle or lack of vehicle. However, in real life, encountering a red light, or "don't-walk" signal, is a normal and inevitable part of urban travel. With the growth of modern cities and the increasing number of bicycle and pedestrian lanes, mass transit vehicles that utilize roadways, carpool lanes, and other forms of transportation that are different from the single occupant automobile, efficient control of the ebb and flow of all traffic through efficient and smart signal-light control and coordination systems has become increasingly important.

There are many substantial benefits to be reaped from improved traffic flow for all types of vehicles. For many commuters, reclaiming part of their day from being stuck in traffic would enhance their quality of life. Further, less congestion on the roads would generate fewer accidents, thereby saving lives. Moreover, traffic delays impinge on productivity and economic efficiency-time spent traveling to and from work is not time spent doing work. Further, many goods must be transported in vehicles and many service providers must travel to their clients to meet with them. Traffic delays all of these economic production factors.

There is also a concern regarding the increased pollution that results from motor vehicles in stop-and-go traffic compared to smooth flowing traffic. Further, longer commutes mean longer running times and also entail more greenhouse gas release. Further, congested traffic and uncoordinated signal lights can cause delays in a mass transit system which, if not remedied, can throw off an entire mass transit schedule grid and disincentive individuals from using mass transit systems. Lastly, the importance of prioritizing and efficiently moving emergency vehicles through traffic lights is axiomatic.

To try and improve traffic flow, there have been a wide variety of different systems developed and implemented. In some cases, these are based on road design. For example, some communities utilize switching lanes where traffic is in one direction during a morning and the opposing direction during an evening to provide a larger roadway in the direction most traffic is expected. Some similar arrangements are the use of specialty lanes (e.g. "Diamond" lanes) which are limited to certain types of vehicles intended to produce less pollution or are carrying an increased passenger load. A problem with these systems, however, is that they are designed for large throughway type systems and do not work for local roads, which are common on both ends of the typical commute.

Within road systems such as city grids, there are currently a variety of different control and coordination systems utilized to ensure the smooth and safe management of traffic flows, the primary issue on local roads, as opposed to large interstates, is the regulation of intersecting traffic lanes and the near ubiquitous stoplight. While traffic flow through intersections can be improved through the use of roundabouts (or rotaries) these systems are often poorly understood by local drivers (particularly in the United States) and can actually create more problems than they solve. The intersection, instead, creates a near essential requirement to impede the flow of some traffic to facilitate the flow of other traffic. In effect, the interaction of traffic at an intersection requires an assignment of who gets to go through the intersection first, in a default, it is simply whoever has the green light at the their time of arrival. However, this is inefficient. People will run or accelerate through changing traffic lights to avoid delays and will sometimes even disregard the traffic light if they become upset at being stopped in what they consider an "unfair" situation.

To deal with the problems created by traffic fights, one commonly utilized mechanism is the traffic controller system. In this system, the liming of a particular signal light is controlled by a traffic controller located inside a cabinet which is at a close proximity to the signal light. Generally, the traffic controller cabinet contains a power panel (to distribute electrical power in the cabinet); a detector interface panel (to connect to loop detectors and other detectors for sensing vehicles); detector amplifiers; a controller; a conflict motor unit; flash transfer relays; and a police panel (to allow the police to disable and control the signal), amongst other components.

Traffic controller cabinets generally operate on the concept of phases or directions of movement grouped together to provide for efficient movement through a traffic light. For example, a simple four-way intersection will have two phases; North/South and East/West; a four-way intersection with independent control for each direction and each left hand turn will have eight phases. Controllers also generally operate on the concept of rings or different arrays of independent timing sequences. For example, in a dual ring controller, opposing left-turn arrows may turn red independently, depending on the amount of traffic. Thus, a typical controller is an eight-phases dual ring controller.

The purpose of the traffic controller cabinet is to try and make sure that traffic is not waiting at the intersection for a long period of time when there is no opposing traffic in the other direction, and to make sure that traffic can move through the intersection in an orderly fashion. Backups and "gridlock" usually occur because the traffic lights do not effectively move traffic through related intersections and because lights are green for too short a period of time in a particular direction. For example, if a first light turns green, but the light in the next block is still red, traffic can back up through the first intersection waiting for the second light to change. If the first light turns back to red before the second turns green, cross traffic on the first intersection is blocked by the cars sitting, in the intersection waiting. Yet vehicles will go into the intersection at every change of the light because otherwise cars in the first direction cannot go through the light at all. Other types of backups and negative interactions are also possible.

To try and deal with these problems, the traffic controller cabinet will generally utilize some form of control over both individual lights, and light networks, to try and improve the flow and prevent these types of problems. The currently utilized control and coordination systems for the typical signal light range from simple clocked timing mechanisms to sophisticated computerized control and coordination systems that self-adjust to minimize the delay to individuals utilizing the roadways. In all cases, the goal is essentially the same. To try to move as many vehicles through the intersection in as little time as possible.

The simplest control system currently utilized is a timer system. In this system, each phase of a traffic light lasts for a specific duration until the next phase change occurs. Generally, this specific timed pattern will repeat itself regardless of the current traffic flows or the location of a priority vehicle within the traffic grid. While this type of control mechanism can be effective in one-way grids where it is often possible to coordinate signal lights to a desired travel speed, this control mechanism is generally not advantageous when the signal timing of the intersection would benefit from being adapted to the changing flows of traffic throughout the day and is generally no longer used in new traffic signal installations. Timing control mechanisms can also work for lights in sequence (e.g. successive blocks) hut generally only work in one direction. Thus, even timing control will generally benefit form at least rudimentary modifications for traffic conditions at different times of day.

Dynamic signals, also known as actuated signals, are programmed to adjust their timing and phasing to meet the changing ebb and flow in traffic patterns throughout the day, Generally, dynamic traffic control systems use input from vehicle detectors to adjust signal timing and phasing. Detectors are devices that use sensors to inform the controller processor whether vehicles or other road users are present and waiting at the intersection. The signal control mechanism at a given light can utilize the input it receives from the detectors to adjust the length and timing of the phases, or if the phases even occur, in accordance with the current traffic volumes and flows.

For example, should a car be waiting to go straight through an intersection, bait no car be waiting to make a left turn from the same direction, the light may turn green for straight traffic, and back to red, without ever triggering a left turn arrow as none is needed. However, had a vehicle have been detected in a turn lane as well, the light may have simultaneously turned green for straight and turning traffic, and the directly opposing direction may never have turned green as no one was waiting. Currently utilized detectors can generally be placed into three main classes: in-pavement detectors, non-intrusive detectors, and demand buttons for pedestrians.

In-pavement detectors are detectors that are located in or underneath the roadway. These detectors typically function similarly to metal detectors or weight detectors, utilizing the metal content or the weight of a vehicle as a trigger to detect the presence of traffic waiting at the light and, thus, can reduce the time period that a green signal is given to an empty road and increase the tune period that a green signal is given to a busy throughway during rush hour. Non-intrusive detectors include video image processors, sensors that use electromagnetic waves or acoustic sensors that detect the presence of vehicles at the intersection waiting for the right of way from a location generally over the roadway and perform essentially the same function as in-pavement detectors, but do not need to be installed in the pavement. Some models of these non-intrusive detectors have the benefit of being able to sense the presence of vehicles or traffic in a general area or virtual detection zone preceding the intersection as opposed to just those waiting. Vehicle detection in these zones can have an impact on the timing of the phases as they can often detect vehicles before they interact with the intersection based on their approach.

The problems with the above systems, however, is that they are geared to detect motorized vehicles in standard motor vehicle lanes and cannot differentiate between different types of signals. In-ground detectors generally rely on a vehicle in a lane having enough metal to trigger a magnetic sensor and video systems generally rely on sufficient volume of an object to be detected as a motor vehicle. To deal with pedestrians, they are commonly supplied a demand button on the sidewalk to request an intersection light change and a crosswalk signal. However, bicyclists, particularly high performance bicycles, and other light vehicles such as mopeds or motorcycles, as well as highly modern car body designs, may not include enough metal to trigger in-road systems and are commonly not allowed to travel on the sidewalk. Further, demand buttons still require the pedestrian to be waiting at, not approaching the intersection so no benefit of detection zones can be obtained. Finally, the systems cannot determine if a vehicle has multiple passengers, is a large mass transit vehicle, is a work vehicle, or is a personal car as they are commonly detected and treated the same way.

In effect, current systems are designed to detect motor vehicles and are centered on the presence of at least one vehicle as the calculator in determining priority. In effect, most systems utilize the presence of one or more vehicles waiting at the intersection (or approaching it) as the "trigger" to indicate that a green light is necessary in that direction. This individual motor vehicle approach provides for some problems of its own in efficiency. In the first instance, these systems generally provide that the approach of a single vehicle that is not traveling in the current flow require an assignment to interrupt current flow at a later time. This is often based on the time to clear the intersection, but does not take into account the relative importance of a particular flow. For example, if a lone car approached a currently very busy cross street, it will generally be the case that it will take a window of time before the cross street traffic can be interrupted. For example, it may take 15 seconds to provide warning before switching from a "walk" to "don't walk" signal for pedestrians that could otherwise be walking in front of the newly arrived vehicle. Once the interruption occurs, the newly arrived vehicle will be allowed to enter the intersection, but the main flow will often be quickly reestablished to avoid further interruption.

The above can actually be extremely inefficient. A few simple examples are the need to spend 15 seconds switching the crosswalk. If there are no pedestrians in the cross walk or approaching, the cross walk could simply change immediately to “don’t walk” without warning, allowing the interruption to occur much quicker meaning the newly arrived driver does not have to wait as long. Secondly, if a second car was to pull up in the same direction as the one now being allowed to go through, the second car may not make the short signal resulting in them having to wait and the need for a second later interruption. In effect, the problem with basing the change on the “presence” of an individual vehicle is that the system utilizes a traffic interruption pattern that is less than efficient for the actual flow of traffic through the intersection that one winch can actually monitor traffic with greater accuracy.

A second problem is that an individual vehicle detector that is motor vehicle centered cannot accurately cater the needs of those that need to utilize the intersection, but are not using motor vehicles. A first example is the need to provide warning of the changing signal to an empty crosswalk with no pedestrians. A second, is a problem with not detecting smaller vehicles and particularly non-motorized vehicles that need the signal to change Bicyclists, in particular, can have problems with intersection detection systems because they are often in a specialized bike lane that actually lacks an in-ground detector, coverage from a video detector and, because they are not on a sidewalk like a pedestrian, do not have ready access to the demand buttons available for pedestrians. It is, thus, very possible for a bicyclist to be forced to sit at an intersection until a car comes along going the direction they wish to go, so that the detection system controlling the intersection can be activated. This regularly forces a bicyclist to either stay with a flow of motor vehicles that can trigger the intersection detection systems for it, or to hope that a motor vehicle is available at the intersection at the right time. The remaining alternative is for them to simply disobey the traffic signal and rely on their own personal determination of safety. This can make bicycle riding on less congested streets (which is often preferred from a safety point of view) a frustrating experience because the bicyclist is constantly being forced to stop at intersections (making the ride more difficult) and waiting when there is no need or to disregard traffic signals, making the safer route more dangerous.

This lack of control of intersection lights not only creates frustration, but can create dangerous situations. Bicyclists aware that they can’t change an intersection to match their needs, may attempt to simply run it on yellow or red or to go faster than they should to keep up with a motor vehicle that will change the light. Alternatively, bicyclists may ride on a sidewalk so they can trigger demand buttons or may choose to ride on more congested roads where motor vehicle traffic is more likely to trigger intersections for them in a beneficial way.

Above and beyond detectors for individual signal lights, coordinated systems that string together and control the timing of multiple signal lights are advantageous in the control of traffic flow within more urban areas. Generally, coordinated systems are controlled from a master controller and are set up so that lights cascade in sequence, thereby allowing a group or “platoon” of vehicles to proceed through a continuous series of green lights. Accordingly, these coordinated systems make it possible for drivers to travel long distances without encountering a red light dramatically improving traffic How. They also encourage adherence to posted speed limits as such adherence results in less stoppage. Generally, on one-way streets this coordination can be accomplished with fairly constant levels of traffic. Two-way streets are much more complicated, but often end up being arranged to correspond with rush hours to allow longer green light times for the heavier volume direction or to have longer greens on larger roads with shorter sections on cross streets.

The most technologically advanced coordinated systems control a series of city-wide signal lights through a centrally controlled system that allows for the signal lights to be coordinated in real-time through sensors that can sense the levels of traffic approaching and leaving a virtual detection zone which precedes a particular intersection. Often these types of systems get away from algorithmic control of traffic patterns (e.g. where platoons are created based on expected traffic flow regardless of whether vehicles are actually present) to priority systems where the priority of any particular motor vehicle at any intersection at any instant can be determined to improve flow. Priority systems allow for very high priority vehicles, such as emergency vehicles, to have unimpeded access even in heavy traffic conditions, and in the best of these systems, traffic flow through the entire grid is changing all the time based on the location of vehicles in the system and determinations of how best to maximize the movement of the most number (or the most desirable type) of vehicles.

While cascading or synchronized central control systems with priority are an improvement on the traditional timer controlled systems, they still have their drawbacks. Namely, very high priority vehicles (e.g. emergency vehicles) in these systems are often only able to interact with a detection zone immediately preceding a particular intersection; there is no real-time monitoring of the traffic flows preceding or following this detection zone across a grid of multiple signal lights. Stated differently, there is no real-time monitoring of how a single vehicle or a group of vehicles travels through a traffic grid as a whole (i.e., approaching, traveling through and leaving intersections along with a vehicle’s transit between intersections). Accordingly, these systems can provide for a priority vehicle, such as an emergency vehicle, to be accelerated through a particular signal at the expense of other vehicles, but they can lack the capability to adapt and adjust traffic flows to respond to the fact that the emergency vehicle has disrupted the flow by its passage and now the remaining flow needs to be modified to accommodate that passage.

If a priority vehicle is sensed in the detection zone, the immediately upcoming light will generally change to green to give the priority vehicle the right-of-way and potentially disrupt the entire system. While this is generally logical for allowing rapid passage of an emergency vehicle where disruption is an acceptable inconvenience for insuring timely emergency services, another issue of disruption not taken into account is pedestrian, bicycle, and other light vehicle traffic. Pedestrian demand buttons need to have an effect on traffic flow to allow for pedestrian movement, but if they actually provide on-demand services, they become effectively the equivalent of a high priority vehicle and can disrupt a coordinated traffic flow.

There are many substantial benefits to be reaped from improved now-motorized traffic flow for individual commuters in urban areas. These benefits are clearest as a part of a traffic grid with coordinated signals, that is, successive intersections that adjust signal timing to grant more green-light time for directions with heavy traffic. A traffic grid with coordinated signals, granting the same consideration to motorized as well as smaller vehicles, bicycles, or pedestrians, offers commuters multiple options for their selected mode of travel, reducing motorized traffic and resulting in less congestion. Congested traffic, and uncoordinated, or unreliable coordination of signals increase travel times and disincentive individuals from smaller, more energy-efficient modes of travel. These other travel modes contribute lower amounts of greenhouse gas pollution. Additionally, travelers that encounter fewer red lights, also have fewer opportunities to cross intersections against the red signal, reducing the likelihood of accidents.

Accordingly, there is a need in the art for a system which can be utilized by both travelers and traffic agencies, that has the ability to detect when a traveler, as opposed to a vehicle, is approaching, or at, an intersection and to communicate their presence to the signal equipment responsible for controlling that intersection so that they can all have similar interactions with a priority system. The signal controller may be programmed to alter the timing phases for the intersection to giant passage to those individuals according to the traffic standards for the given area to provide priority to different types of vehicles at different times.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art. described herein, among other things, is a detection system that: 1) enables pedestrians or individuals on smaller conveyances to communicate their location and direction of travel; 2) enables traffic networks to receive this communication and output the detected data to the corresponding intersection traffic-signal controller, as with motorized vehicles; and 3) utilizes this information in the signal-coordination calculations for the traffic network.

There is described herein, in an embodiment, a method for assisting a traveler through an intersection, the method comprising; providing a mobile communication device associated with a traveler, the mobile communication device being configured to transmit its location and direction of travel information; determining a mode of transportation for the traveler; evaluating the location and direction of travel information to determine if the traveler is approaching an intersection; if the traveler is approaching the intersection, assigning a priority to the traveler for the traveler to go through the intersection based at least in part on the determined mode of transportation; and altering a traffic signal at the intersection based on the assigned priority.

In an embodiment of the method, the mobile communication device only transmits the direction of travel information if the mobile device is in a preselected detection zone proximate the intersection.

In an embodiment of the method, the direction of travel information comprises the direction that the mobile communication device is moving.

In an embodiment of the method, the direction of travel information comprises the direction that a mobile communication device is pointed.

In an embodiment of the method, the direction of travel information comprises a direction indicated on the mobile communication device.

In an embodiment of the method, the mode of transportation is an autonomous vehicle.

In an embodiment of the method, the mode of transportation is a bicycle.

In an embodiment of the method, the mode of transportation is a personal mobility device.

In an embodiment of the method, the mode of transportation is a motor vehicle.

In an embodiment of the method, the determining a mode of transportation for the traveler comprises determining whether the traveler is a pedestrian or is aboard a vehicle.

In an embodiment of the method, the method further comprises determining a type of vehicle the traveler is aboard if the each traveler is determined to be aboard a vehicle.

In an embodiment of the method, the assigned priority is a higher priority if the determined mode of transportation is selected from the group consisting of: a carpool vehicle, a mass transit vehicle, a municipal vehicle, and an autonomous vehicle.

In an embodiment of the method, the determining a mode of transportation for the traveler is based at least in part on the location and direction of travel information.

In an embodiment of the method, the determining a mode of transportation for the traveler is based at least in part on observed speed information related to the traveler.

In an embodiment of the method, the determining a mode of transportation for the traveler is based at least in part on observed acceleration information related to the traveler.

In an embodiment of the method, the determining a mode of transportation for the traveler is based at least in part on observed vibration level information related to the mobile communication device.

In an embodiment of the method, the assigning a priority to the traveler for the traveler to go through the intersection is based at least in part on the location and direction of travel information.

In an embodiment of the method, the determining uses information received from a vehicle.

In an embodiment of the method, the determining uses information received from a vehicle, and the vehicle is an autonomous vehicle.

In an embodiment of the method, the determining uses information from an app stored on the mobile communication device.

DESCRIPTION OF THE PREFERRED EMBODIMENT(S)

Figure 1:
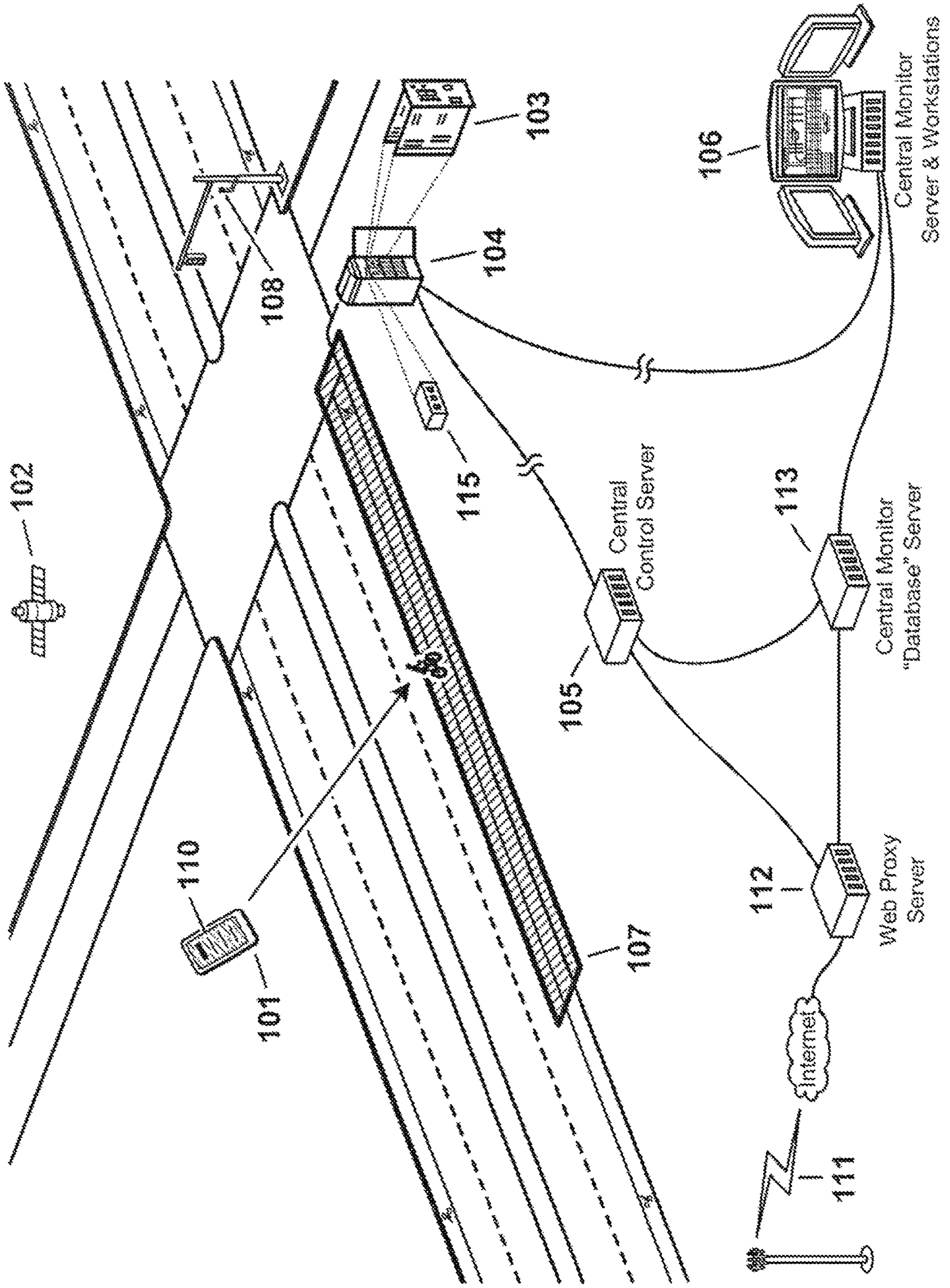
FIG. 1 provides a perspective view of a diagram of an embodiment of a system detecting a bicyclist carrying a mobile communications device and approaching an intersection while riding within a bicycle lane.

As a preliminary matter, it should be noted that while the description of various embodiments of the disclosed system will primarily discuss the movement of smaller non-motorized vehicles an a roadway (such as, but not limited to, bicycles), this is not intended to be limiting. A large variety of motorized smaller vehicles, non-motorized vehicles regardless of size, and pedestrians need to go through signal lights. Further, these travelers may be on the roadway, in protected lanes, or on a sidewalk and still need to be detected. Still further, an individual in a standard motorized vehicle may need to have priority for a certain reason (e.g. a doctor trying to get to an emergency room) or may be provided with priority as a benefit (e.g. because they have paid a fee). Finally, certain types of mass transit vehicles may need to have priority to stay on schedule, to allow for express services between stops to be effectively provided, and to encourage use of mass transit.

Thus the systems and methods discussed herein are designed to work for any individual by detecting the presence of the individual at the intersection as opposed to a motor vehicle. This includes them being a pedestrian, a driver and/or passenger in any type of vehicle, particularly those not easily detected by traditional methods, which could benefit from the detection system described herein. This disclosure therefore provides a system which focuses on the individual "traveler" (where a traveler is effectively an individual person or a unit based on a person, for example a self-driving vehicle with no human on-board) as opposed to an individual vehicle as the determiner for how to select priority for any traveler in the system. For example, it is contemplated that the system could be applied to and utilized by people aboard motorcycles, scooters, personal mobility devices, golf cars or golf carts, or other vehicles not easily or reliably detected by traditional detection methods used to detect motor vehicles. It could also be used by those in more traditional motor vehicles such as cars and trucks where the system may detect a passenger instead of or in addition to the vehicle itself. The system can also be used to detect pedestrians such as those who may be walking, running, skateboarding, roller blading, or otherwise utilizing a street or sidewalk for travel recognizing that these individuals can be moving at very disparate speeds from each other. In this disclosure, all the above individuals will be referred to as "travelers". The key specifies of a traveler is simply that it is an individual going between two locations and have at least one intersection between them that the travelers need to interact with along the way.

In much of this disclosure, the traveler will be discussed as utilizing a bicycle for transportation as this provides a representative example of how the system can operate and a well understood form of conveyance. Bicycles also generally operate on the street (as opposed to the sidewalk) and operate at speeds disparate from most motor vehicles. As should be apparent, as the system is generally designed to detect the individual traveler, as opposed to the vehicle, so long as an individual is present, the system can detect them. Further, the system is generally not concerned with what type of vehicle they are operating (if any). Instead, it is simply interested that they are approaching the intersection, in a particular lane and at a particular speed. It then allows for them to interact with the intersection in a manner similar to all other travelers interacting with the same intersection that have the same priority as they do.

Generally, the system for the detection of individuals at roadway intersections described herein is contemplated for use in an applicable traffic control system known to those of ordinary skill in the art and, in certain embodiments, is integrated into existing systems known to those of ordinary skill in the art which monitor and control the operation of traffic signals. In an embodiment, the systems and methods discussed herein are used in conjunction with various vehicle priority systems where certain vehicles can be given priority over others at a particular time as opposed to systems which utilize timing algorithms to determine traffic flow, Throughout this disclosure, the term "computer" describes hardware which generally implements functionality provided by digital computing technology, particularly computing functionality associated with microprocessors. The term "compute" is not intended to be limited to any specific type of computing device, butt is intended to be inclusive of all computational devices including, but not limited to; processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including, but not limited to eyewear, wrist wear, pendants, and clip-on devices.

As used herein, a "computer" is necessarily an abstraction of the functionality provided by a single computer device outlined with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used reference to an enterprise class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit, the characteristics of a "computer" in certain contexts. Where such a device is performing the functions of a "computer" as described herein, the term "computer" includes such devices to that extent. Devices of this type include hut are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile communication device". A mobile communication device may be, but is not limited to, a smart phone, tablet PC, e-reader, satellite navigation system ("SatNav"), fitness device (e.g. a Fitbit™ or Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in constant communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications or similar network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including hut not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a net work communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the tithe required is longer than how long a consumer of the output would wait for the output, or because the number and/or complexity of the calculations, the commercial value of the output would be exceeded by the cost of producing it.

Figure 2:
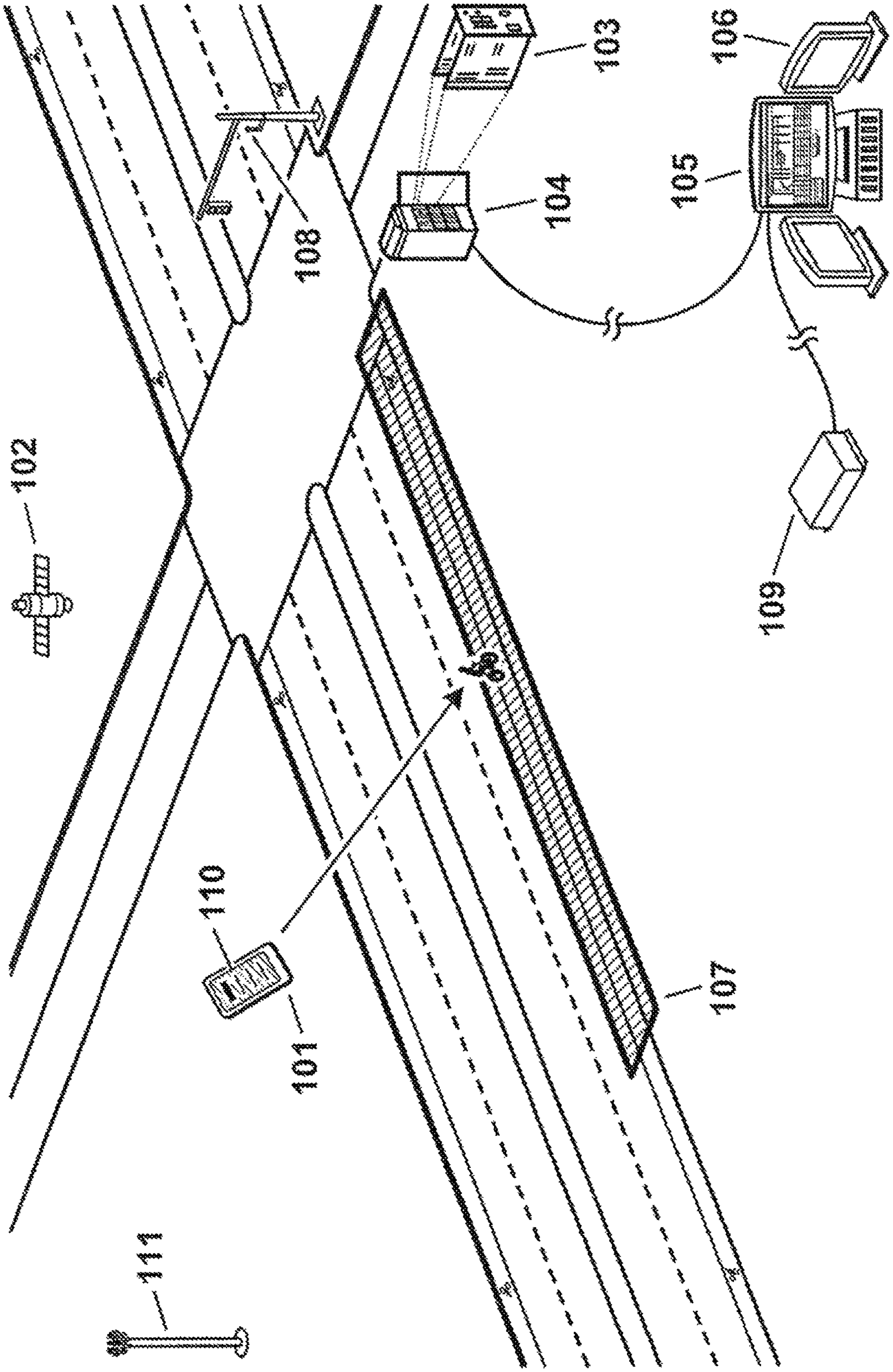
FIG. 2 provides a perspective view of a diagram of an embodiment of a detection process using a communications server to runs qualification algorithms to determine if the mobile communications device is in a detection zone and meets other pre-defined parameters.

In an embodiment, such as those shown in FIGS. 1 and 2, a system (100) for detection of travelers at roadway intersections as disclosed herein is generally comprised of a mobile communications device (101) capable of determining its location in real-time, using location data from positioning satellites (102), inertial navigation, Wi-Fi, local radio location sources such as cellular signals (111), and/or by any other positioning methodology known to those of ordinary skill in the art and which is carried by the traveler. The mobile communications device (101) is generally also equipped with a computer operating system capable of running a third-party software application (110) (e.g. an "app"), which is also part of the disclosed system. It should be recognized that mobile communications on a particular frequency is not determinative as it is contemplated that the mobile device (101) could also transmit communications via cellular, Wi-Fi, short-range UHF Bluetooth, any other transmission range or spectrum now known to those of skill in the art or later discovered. In an embodiment, the system (100) will actually utilize two different forms of communication with the mobile communication device (101). One firm will be designed to be longer range if) provide general location information while a shorter range system can be used in proximity to receivers (115). This can be used to save battery power in the mobile device (101).

In an embodiment, a plurality of traffic intersections may be equipped with individual short-range devices (115) so that when the mobile communications device (101) is within transmission range of the short-range UHF device (115), both devices (115) and (101) recognize their proximity to each other, Upon recognizing its proximity to the short-range UHF device (115), the mobile communications device (101) is capable of increasing the occurrence of location-data transmissions, which allows it to preserve battery power by sending fewer occurrences of location data transmissions when located far from intersections or other equipped locations where detection is desired while still improving location and movement information transmitted when the traveler is closer to the intersection.

In an embodiment, the system (100) will be further comprised of a plurality of priority detectors (103) that are generally located at various locations along vehicle roadways, Specifically, each of the priority detectors (103) will generally be associated with a particular traffic intersection. In the present embodiment, a traffic intersection is defined as any point in traffic flow where any Iwo travelers could be forced to interact with each other in a fashion where one would need to wait for the other. Thus, an intersection may be a street and cross street, a highway interchange, an entrance or exit ramp, a rotary or roundabout, a driveway connection to a road, or any related location. The present application is only concerned with a traffic intersection where there is at least one controllable traffic indicator present. This will generally be a standard three color (red, yellow, green) light system but may be a single color system (flashing or solid red) or a more complicated light system utilizing multiple arrows of multiple colors.

A priority detector (103) will generally comprise a computer and related hardware infrastructure to allow for at least some control over the traffic control indicators of the highway intersection. For example, one common location for priority detectors (103) will be at or in close proximity to intersections inside traffic-controller cabinets (104) for example. Generally, these priority detectors function as intermediaries in the overall system, forwarding pedestrian and vehicle-detection signals to the traffic-signal controller, receiving signals from a central control server (105), or forwarding detection signals from a plurality of mobile communications devices (101) to a central control server (105).

One component of the priority detector units (103) is the intersection antenna (108). This antenna (108) is generally any antenna known to those of skill in the art that is capable of receiving, radio or other electromagnetic signals from the mobile, communication device (101). In an embodiment, the antenna (108) will be co-located with the priority detector (103). In other embodiments, the antenna (108) will be located at a position removed from the priority detector (103). Generally, it is contemplated that the intersection antenna (108) may be located at any place near the applicable intersection that would allow for the effective transmission and receipt of signals. For example, in certain embodiments it is contemplated that the intersection antenna (108) will be externally mounted on a signal light pole at the intersection. In an embodiment, the intersection antenna (108) will be connected to the priority detector unit (103) by wire connections, such as, but not limited to, by two coax cable connections each of which carries a different type of communication signal (for example, one for UHF and one for GPS), in another embodiment, the intersection antenna (108) will be connected wirelessly to the priority detector unit (103) in a manner known to those of ordinary skill in the art.

In order to associate a communicating mobile communication device (101) with an appropriate intersection, each intersection will generally have at least one, and usually a plurality of geographic areas where it is determined that travelers should be detected if they are to interact with the specific associated intersection. As shown in FIGS. 1 and 2, these are commonly the areas of approach via roadways to the intersection and are generally identified, defined, and saved as detection zones (107). The detection zones (107) are generally defined by their global coordinates and generally may take any shape (e.g., circular, polygonal, linear etc.) to appropriately represent the approaches to the intersection in a way that makes sense based on the operation of the intersection. Multiple zones (107) may also be set up in a potentially overlapping configuration within the system-configuration software to elicit different responses from the system (100).

In the depicted embodiment of FIGS. 1 and 2, the detection zones (107) are arranged to extend along the flow of the roadway approaching the intersection. They are generally configured to activate a succession of communication signals from the mobile communications device (101), through the associated wireless network, to notify the central control server (105) that the device is within the detection zone (107) and/or how it is moving within the detection zone (107). In other embodiments, there are a number of conditions that may be configured, in addition to being located within a detection zone, before the mobile communication device (101) will activate the communication signals to the central control server (105).

Detection zones (107) will commonly be designed so as to take into account the type of expected traveler to be approaching in a specific zone. Thus, one detection zone (107) may correspond to a particular portion of the roadway directed to traffic going straight through an intersection, while a different zone (107) may be arranged for traffic intending to turn at an intersection. In this way, the direction of a traveler in a particular zone (107) may be inferred from their position. Similarly, a detection zone (107) may be arranged to cover a sidewalk but not a roadway. In this detection zone (107), the traveler would not be expected to be using a motor vehicle, for example, and that can influence the decision on how they are treated.

In an alternative embodiment, the mobile communication device (101) may be configured to activate communication signals only after determining that the mobile communication device (101) is traveling in a pre-defined direction, or within a defined directional range, while the mobile communication device (101) is within a given detection zone (107). Specifically, the device would only communicate with an intersection if it is both in the zone (107) for that intersection and moving toward the intersection. It should be recognized that while the above is the most likely arrangement, any number of conditions may be configured to elicit the active response from the mobile device (101).

It also should be recognized, that detection of an individual that needs to interact with an intersection will generally require two criteria. The first criteria is that the individual is near the particular intersection and the second is that he/she is approaching it. The first is clearly necessary so that the traveler only triggers an intersection that he/she will be next entering. Generally, it is undesirable that the user activate an intersection which requires he/she to pass through a prior intersection to interact with or to activate an intersection he/she is moving away from. The second is that the traveler is actually moving toward the intersection as opposed to a direction which will not take them to the intersection.

While it is desirable, in an embodiment, to allow intersections to prepare for travelers that are not at the intersection yet, this will most commonly be done by interaction between the priority systems at the various intersections. This is so that control of the various intersection is dependent not on a single traveler, but a group of travelers. Specifically, if a first intersection creates a platoon of vehicles to send to a second intersection, it is valuable that the second intersection learn from the first the number of vehicles in the platoon and the time it was released through the first intersection. This can allow the second intersection to detect the approaching platoon and react accordingly based on its size and its distribution as it approaches.

In the preferred embodiment, the central control server (105) receives the location and direction, data that is sent from the mobile communications device (101) from the antenna (108) and determines whether the data meets the defined criteria for transmitting the individual's presence to the corresponding intersection priority detector (103). Generally, receipt of this data will occur in real-time or near real time as the mobile communication device (101) approaches Ole intersection. Further in the preferred embodiment, the central control server (105) is generally a computer or series of computers that link other computers or electronic devices together. Generally, any known combination or orientation of server hardware and server operating systems known to those of ordinary skill in art is contemplated.

In an embodiment, the central control server (105) is communicably linked to a plurality of priority detectors (10) in the system by a wireless network or a combination of a wired and wireless network that allows for the free transmission of information and data, allowing centralized control of a number of signals. Further in the preferred embodiment, the central control server (105) is connected to a central monitor server (111) that contains a database of defined detection-zone (107) locations, which is utilized to determine if the mobile communications device (101) is currently located in a detection zone (107).

In another embodiment, the central monitor server (11) is also connected to a plurality of central workstations (106) upon which a plurality of intersection and mobile communications device (101) locations, and activity from a plurality of priority detectors (103) an mobile communications devices (101) can be depicted in real time.

As shown in FIG. 2, the system (100) may additionally utilize a communications server (109), which is communicatively connected to the central control server (105) for the purpose of wirelessly transmitting information about detected devices to a plurality of intersection priority detectors.

The central control server (105) may be configured to send zone-location information for a particular region to the mobile communications device (101) so the software application (110) is able to calculate and determine whether it is currently in a detection zone (107), as well as if any other required parameters are being met that will activate the mobile communications device (101) for sending communications signals to the central control server (105).

In order to identify individual travelers, a software application 110) (or hardware equivalent) is generally installed on, the mobile communications device (101) for the purpose of determining the individual traveler's global position and direction of travel, and transmitting this information to the central control server (105) or other hardware used to receive this information and forward it to the central control server (105), in another embodiment, the software application (110) is also utilized to determine whether the traveler is within a pre-defined detection zone (107), proximate to an intersection or other wayside location, and determining whether the mobile communications device (101) should actively transmit the traveler's location to the central control server (105) so that pedestrian and vehicle-detection signals may be communicated to the corresponding wayside priority detector (103) and, thus, forwarded to the intersection signal controller. This software application, or hardware implementation thereof, may be designed to be always running. In effect, the central control server (10) can detect the presence and movement of the mobile communication device (101) regardless of its current operating state. For example, the central control server (105) could simply track any device currently broadcasting some specific signal, for example a cellular signal, or capable of receiving a ping signal on a particular network (for example a Bluetooth request to connect).

Alternatively, the software application, or corresponding hardware implementation, could be required to be activated to communicate and be detected by the central control server. The two options could also be used together where the former provides more basic detection and the later provides more detailed data, U.S. patent application Ser. No. 15/043,836, the entire disclosure of which is herein incorporated by reference, provides tot examples of how the motion of a detection device within a detection zone can be used to determine the position and arrival time of a traveler in the present case.

One problem that exists in detecting a traveler is determining their intent at an intersection. Particularly when an intersection is designed with specific lanes or sidewalks for non-motorized travelers (as many modern streets are) it can difficult to determine the direction of travel of a traveler through the intersection. For example, a traveler approaching an intersection from the south going north is highly unlikely to leave the intersection going south. However, they may go straight through the intersection (north) turn right (east) or turn left (west). Sometimes this problem will be solved by road design. For example, if a bicycle is in a traffic lane, the system may be able to change the light in the same manner as it would for a motor vehicle in the same lane. Similarly, for a one-way road intersecting with another one-way road, the intent of the traveler to go straight or turn may not matter since both activities are allowed with the same signal.

In an alternative system, the system can infer the intent based on the specific behavior at the intersection and the road structure. For example, if a bicyclist approaches the intersection in a protected hike lane on the right side of the road and can turn right to another protected bike lane on the cross street, they may do so even if the light is red and without slowing down. Thus, if the traveler approaches the intersection, stops, and does not continue to turn right, the system can make the assumption that they are intending to go straight through the intersection. This assumption is based on the fact that they 1) did not turn right and 2) are in protected lane on the right side of the road which, would require them to turn left across traffic in the same direction of flow as them which is highly undesirable.

In a still further embodiment, the mobile device may provide for controls which allow for a user to indicate to the signal their desired activity at the intersection. For example, the mobile device (101) could receive an inquiry from the priority system as to what the user wishes to do. The user can then use a quick indication using the mobile device (101) to indicate their intention. For example, if they wish to go straight, they could do nothing. If they wish to go right, they could tap a large right arrow on the screen, swipe the screen to the right, or swing the mobile device (101) to the right. A similar option could exist for a left turn. In this way the priority system does not provide a traffic cycle at the intersection which is not useable to any motor vehicles or the bicycle.

Systems could also integrate with known mapping software to determine proposed route.

If the user had a route currently open which indicated that they should turn right at the intersection, the system can presume they are intending to turn right and plan accordingly.

Approach of an intersection can be much more important for travelers in non-motorized vehicles than those in motorized vehicles. While motorized vehicles can leave a roadway for various reasons (e.g. to park) the vast majority of motorized vehicles that pass through a first intersection wilt still be travelling at the next in-line intersection. They also will not commonly change direction in a short distance between intersections not make a "U-turn" in the middle of the street). However, this is often not true of non-motorized travelers, and particularly pedestrians. Pedestrians may stop, change direction, or go off the roadway with much more frequency than motor vehicles. Thus, it is very desirable in a traveler detection system to determine if a pedestrian is intending to pass into the intersection, or is simply nearby the intersection, but doing something else.

In an embodiment, the facing can be determined by evaluating if the traveler turns at the corner to face a different direction than the prior one of travel, or if they gesture with their phone to the direction they want to go. Either can be detected by internal sensors in the phone and activate based on that (inertial detection), or can give the traveler a button to indicate their desired direction directly. Such a button may also be provided because the location of the traveler is detected as sufficiently close to the intersection for the system to believe that they are likely to be wishing to use the intersection. Existing mapping software with route panning can also provide an expected indication of the pedestrian's intention at the intersection by assuming they are intending to follow the selected route.

A problem with pedestrians approaching an intersection, however, is determining which way they wish to go. Some may go straight through the intersection (needing to utilize a crosswalk in a first direction), while others may wish to turn (generally left in the United States) and go through the intersection (needing to utilize a crosswalk in the opposing direction), while other may turn (generally right in the United States) to walk away from the intersection without having to enter it (needing no crosswalk). As opposed to roadways, sidewalks will generally not have turn lanes or specific waiting areas for specific directions, so the desire of the pedestrian can generally only be determined when they reach the intersection or get very close to it. However, the determination can often be made quickly. For example, a pedestrian wanting to go the direction where the crosswalk is currently available ("walk") will generally not slow down as they approach the intersection and will simply pass immediately into the crosswalk. Similarly, a pedestrian turning away from the intersection will also generally not slow down or stop. Only a pedestrian wishing to cross the currently unavailable crosswalk will generally slow down and stop. As only the pedestrian of the final case requires a modification of the traffic signal, the first two groups can actually be ignored in determining priority of signal as they currently have it.

In general operation, the system (100) may operate as follows with reference to FIG. 1. At the particular intersection there will at a certain time be a plurality of travelers in proximity to the intersection. These travelers will generally be in detection zones (107) associated with the intersection and may be travelling in a variety of different lanes and at different speeds. The antenna (108) will detect signals from at least one of the travelers indicating that the traveler is in the zone, approaching the intersection, and is doing so at a particular speed.

One of the benefits of placing the detection on a mobile device is that it allows the intersection to take into account the movement of individuals, as opposed to vehicles. Specifically, the individuality of the detector allows for determinations based on person flow, as opposed to vehicle flow. In standard traffic control systems, the default measurement is the vehicle and particularly the motor vehicle. Thus, the system will act to accommodate the greatest vehicle flow. This is, however, not necessarily efficient For example, three city buses will generally be carrying far more passengers than three small cars. Thus, there may be a desire to move the buses through first to get more people to their target destination quicker.

The system will take the information from all the travelers approaching the zone (107) and determine the appropriate arrangement for the signals at the intersection. This determination will commonly take into account when the various travelers are expected to reach the intersection and can account for if travelers will need to slow down or stop before they reach the intersection with a particular configuration of signals. Based on this evaluation, the central controller (105) will make a determination of how to alter (if at all) the current signal pattern at the intersection and will instruct the local priority detector (103) to make such a change.

This calculation will generally take into account certain variables for the traveler, and some default variables. The default variables include the current configuration of the lights at the intersection (which provides travelers in a current direction current priority), the minimum and maximum times that any current configuration can or should be maintained, and the time it takes to transition the intersection between any different configurations. The variables for the traveler will generally comprise which detection zone they are in, their relative speed (or time to arrival at the intersection), and their direction of travel. In many situations, the presence of a traveler in a certain configuration will result in their being eliminated as being a traveler for purposes of controlling the intersection. For example, a pedestrian standing still will generally be ignored and not treated as a traveler until they move.

Control of the intersection will generally be based on the available phases at the intersection as well as interaction of phases and rings. This can get quite complex, but ultimately the arrangement of any intersection can be broken down to provide for a series of phases which are considered safe operations. For example, at a four-way intersection (North, South, East, West) with each direction having a left turn lane and signal, and each direction having a cross walk, the phases of the direction looking North into the intersection to allow a vehicle in the roadway to turn west (left) can have the following "safe" options: a) North turn arrow only no crosswalk access; b) North and South turn arrow together no crosswalk access; c) North turn arrow and straight together no crosswalk access; d) North turn arrow only East Side crosswalk access; e) North turn arrow only East Side and North Side crosswalk access; f) North turn arrow and straight together with East Side crosswalk access; and g) North turn arrow only with North Side crosswalk access.

As should be apparent, the "safe" options above can be broken down into their component parts (e.g. North turn arrow) and the parts can be presented in any combination recognizing that unsafe combinations would be excluded. The phase to be activated (the collection of component parts) can then be selected based on the position and relative movement of travelers. Generally, the phase will be selected to move all waiting or approaching travelers through the intersection with as little delay as possible. Thus, if there is a vehicle turning from North to west, the left turn arrow will be activated. However, the activation of any other light or signal will generally not occur unless there is also a traveler waiting for that signal. Thus, if there is just the single vehicle waiting, phase (a) will typically selected as the next phase. If there was also a pedestrian waiting to cross the North side as well, option (g) would be used instead.

The selection of phase will generally be the minimum activation to move all waiting travelers that are desired to be moved in this iteration recognizing that a traveler may have to wait through one or more phases before being allowed to proceed. This later will be the case to deal with opposing needs. For example, a traveler wishing to cross the South Side crosswalk cannot go at the same time as the above turning vehicle as they would cross right through the path of the turning vehicle. Thus, one must go first and the other second. This is the assignment of priority between the various travelers. While activation in the phase is generally of the minimum, this is not required and additional directions of travel may be provided if desired even if there is not expected to be a traveler to use them.

The assignment of priority to the travelers can depend on a variety of factors. Generally, the priority will be assigned to move travelers through the intersection with the minimum amount of slowdown across all travelers, but also including a position where any individual traveler will not be forced to wait more than a predetermined maximum time. The priority, thus, will often be assigned by the number of travelers approaching in a particular direction, when each will reach the intersection within their detection zone, the travelers desired action at the intersection, and if a particular traveler should have an increased or decreased priority fir some reason (for example giving priority to a mass transit vehicle, emergency vehicle, electric vehicle, slower vehicle, or smaller vehicle).

As an example, presume there are four travelers approaching an intersection having a north-south and au east-west street which cross. The first traveler (A) is in the detection zone approaching from the south going north. Based on the distance and his current speed, he will reach the intersection in 10 seconds. A second traveler (B) is approaching from the north going south. This traveler is going much slower and will reach the intersection in 40 seconds. There are also two travelers (C) and (D) on the cross street who are both approaching from the west going east. They will each reach the intersection in 20 seconds as they are going the same speed as traveler A, but have just entered the detection zone. The signal is currently green for east-west traffic and takes 10 seconds to change.

Based on the above, the system (100) may leave the light as it is for 20 seconds. This allows travelers C and D to go through the intersection while traveler A is forced to stop. The system can then change the signal. This will allow traveler B to go through the intersection without stopping and also allow traveler A to resume and go through the intersection having only been forced to wait 20 seconds (plus the 10 seconds it took them to reach the intersection).

This pattern will generally produce the least amount of forced slowdown between vehicles (Only traveler A had to wait, and only for a total of 20 seconds). Compare this to a standard detection system as presently used and the benefit becomes apparent. In a prior system, the light would stay as it is until traveler A stops at the intersection. Traveler A will wait 10 seconds for the light to change and then go though. As soon as the light changes, C&D arrive at the intersection, they will then wait for A to go through and the 10 seconds as the light changes. The same thing happens to B. Thus, the total wait time for the four travelers is over 40 seconds.

The present system also allows for the much slower vehicle (traveler B) which may be a bicycle or pedestrian, to not have to stop while a fastest vehicle (traveler A) is the only one slowed down. Further, traveler A, because the light was already red as they were approaching, was likely already slowing down anyway. Thus, when the system tried to switch over to allow traveler A through, it resulted in all the travelers having to stop instead of just one.

Another key difference between the above example and a standard intersection, is the detection of traveler B. In a standard looped ring system, for example, none of the travelers would have yet been detected. Traveler A would trigger the system first causing the light to change to allow her through. Travelers C and D would then likely trigger the system to change to allow them through. Traveler B, upon reaching the intersection, would find the light against him, and would have no way to change the light if he was not detectable and would be forced to wait for a detectable vehicle to approach from the north or south.

As should be apparent, in the above situation, most of the travelers are alone. However, C and D are moving together. As C and D represent two travelers, there is some desire to make sure their motion is unimpeded as they can double the amount of efficiency from it. Such focus, as discussed above, on enhancing the efficiency of groups of people travelling together (e.g. C and D) and on slower vehicles (such as B) can actually result in an implicit encouragement to further increase efficiency. For example, having activation encourage constant movement of bicycle speed traffic, at the expensive of single motor vehicles, can result in an encouragement to utilize bicycles. Similarly, more efficient mass transit and carpool vehicles can encourage use of such situations.

An advantage of using a priority system assigned to each individual traveler as opposed to other forms of traffic light controller is that a priority system can utilize a ladder of priorities and can have priorities interact. For example, should an emergency vehicle be coming, it can be given priority over everything else. Notifications can also be provided by the system back to the mobile device that there is an emergency vehicle approaching and the mobile communication device associated with the traveler will not be given priority. Thus, a bicycle can have their mobile device sound and vibrate as they approach the intersection to warn the bicyclist not to attempt to go into the intersection and that they will need to slow down. Secondarily, a city planner could then give a particular form of transportation a priority to encourage its use or based on its expected use. Thus, small vehicles could have priority during rush hour to encourage their use (like high occupancy vehicle (HOV) lanes). Similarly, mass transit vehicles could have a tertiary priority for the same reason.

Priority systems such as the above also allow for prioritization based on the amount of travelers as opposed to the amount of vehicles. As contemplated previously, the present systems act to disconnect the traveler from their vehicle. In many respects, the system does not care how the traveler is arriving at the intersection, only that they are arriving and when (or at what speed). This allows for simplification of the priority algorithms to improve the priority of the most number of individuals (travelers) as opposed to the most vehicles. For example, the present system will generally treat a bicycle and a car each just with a single individual as each being one traveler, they simply have different speeds and potential positioning on the roadway.

While disconnection of the traveler from the vehicle in a particular embodiment can be desirable, knowing that the traveler is associated with a particular type of vehicle, and that they are currently within that vehicle, can provide for still further priority refinement. For example, a municipal vehicle, such as street sweeper, may be identified by the owner of the mobile communication device (101) being a municipality. This traveler can be given priority only if such a mobile communication device (101) is known to be in a particular vehicle, namely in a municipal vehicle which also includes a transmitter and is in communication with the mobile communication device (101) the central control system (105) or both. Still further, 15 people in individual cars can be treated the same as a single bus with a driver and 14 passengers as each involves 15 travelers or the bus can be given priority because a signal identifying the bus can be received in addition to the signal identifying each passenger. Based on the treatment of travelers and not vehicles, it should be readily apparent that, a priority systems designed to maximize traveler efficiency, will commonly encourage alternative modes of transportation. A group of slower moving pedestrians will often gain priority over single motor vehicle drivers as the pedestrians wall be in a group at the intersection, while motor vehicles may be spread out. Similarly, a bus or other mass transit vehicle will often have priority over passenger cars even if it is not identified as a bus specifically. Further, in an arrangement, people carpooling can actually be given priority over those who are not (as a car with four people can be treated the same way as four individual cars for purposes of priority).

Priority systems also allow for an the fly adjustment of priority based on changing circumstances. As contemplated above, to encourage motor vehicle efficiency, motor vehicles are often grouped or "platooned" in going through consecutive intersections. In this way, motor vehicle operators will generally stop at a fixed number of lights (often only one or two) through a large number of intersections so long as they travel at around a predetermined speed. Small vehicles (particularly non-motorized ones such as bicycles) will often travel slower than this speed. However, in a priority system, small vehicles can also be platooned and then the small vehicle (slower moving) platoon can then have a higher priority when it approaches the next intersection compared to a platoon of similar size travelling faster. What this can create is a system where motorized vehicles still travel very efficiently, but may have to stop at an additional light or two, while non-motorized vehicles effectively flow as platoons around the platoons of motor vehicles and don't have to stop at all. This can make the transportation of all travelers more efficient.

As a simple example, if the predetermined speed for motor vehicle platoons was 40 miles per hour, and for non-motorized vehicle platoons was 1.5 miles per hour, a motorized vehicle platoon may have to stop at an additional intersection to allow for the non-motorized platoon to maintain speed on a cross street even though other motorized platoons have already passed that same intersection. However, due to the speed differential, the motorized platoon will be differently positioned relative a non-motorized platoon at the next intersection and will generally not interact with it allowing them to potentially get multiple lights ahead of the non-motorized platoon.

In one embodiment, the disclosed system and method is carried out as follows: The third-party software application (110) is installed and run on a mobile communications device (101). Through communication with the central control server (105), the software application (110) determines the current device location, direction of travel, and approximate speed of travel, referred to in this embodiment as "location data". The software application periodically transmits this location data, along with a unique ID number that serves to identify the mobile communications device (101), through the cellular network to be received by the central control server (105). The central control server (105) receives and queues the plurality of periodic transmissions, runs qualification algorithms to determine if the mobile communications device (101) is in a detection zone (107) and meets any other pre-defined parameters. Upon determining that the device (101) meets the location and pre-defined parameters, the central control server (105) creates a location message based on the received location data, and relays the message, over a private data network (for example, the city traffic network) to the priority detector (103) for the corresponding intersection.

Figure 3:
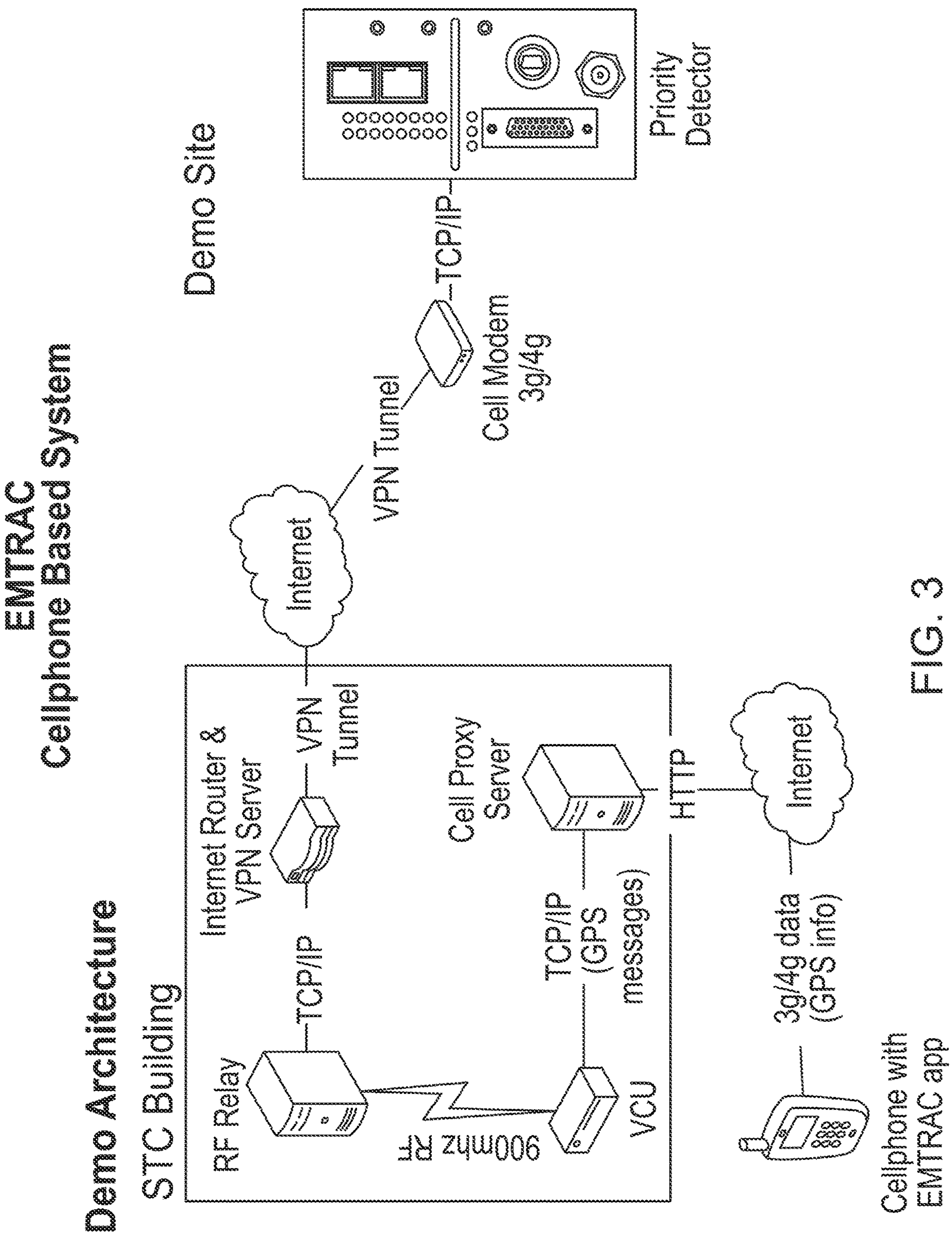
FIG. 3 provides a general block diagram of an embodiment of a system for detecting a mobile communication device.
Figure 4:
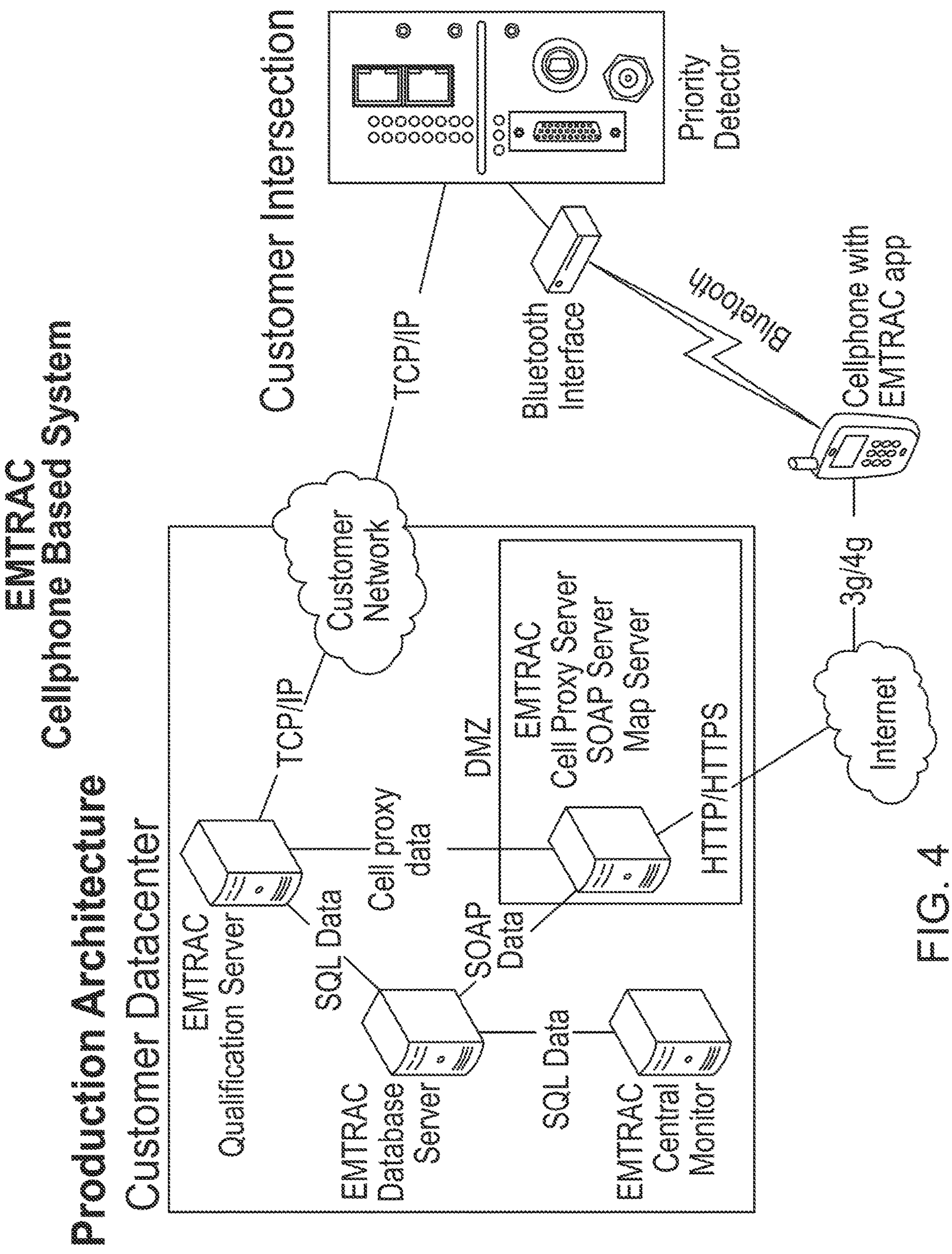
FIG. 4 provides a general block diagram of an alternative embodiment of a system for detecting a mobile communication device.

In one embodiment, a web proxy server (112), which serves as a security barrier between the internet and the central control server (105), receives the location data from the mobile communications device (101), creates a location message, and sends that message to the central control server (105), which runs qualification algorithms to determine if the mobile communications device (101) is in a detection zone (107). FIGS. 3 and 4 provide an embodiment of an exemplary traffic preemption system which lays out communications diagrams for such a process.

In another embodiment, the central control server (105) is connected, through the private network, with a central monitor server (113), which provides for the display of real-time detected individual locations, retrieval of intersection activity logs, program updates, and the configuration of system settings. The central monitor server (113) is also connected to a plurality of computer workstations for further display of this activity.

In another embodiment, the software application (110) on the mobile communications device (101) is capable of displaying a confirmation message or screen to notify the individual that their device is within a detection zone (107), as well as additional status information, including whether the device has transmitted its location data, whether the device's presence has been recognized by the priority detector (103) or traffic controller in the intersection control cabinet (104), or other status information received from equipment in the traffic control cabinet (104). This received information could originate from the central control server (105), the priority detector (103), external traffic network servers, or other computers on the traffic network. In this embodiment, an audible alert may be sounded in accord with the confirmation message or screen.

It should be recognized that one concern is potential abuse of the priority system by users. Specifically, if the system is arranged so a bicyclist using the system is given priority over a motor vehicle detected by other means, a user may be tempted to run their app in "bicycle mode" while riding as a passenger in a car to attempt to gain priority. These concerns can be reduced or alleviated by how priority is selected. As contemplated above, one particularly valuable methodology for doing this is for the priority (outside of particular vehicles such as emergency vehicles which definitively identify themselves to the system) to be arranged in a fashion that maximizes traveler (as opposed to vehicle) throughput through the intersection. In this way, a particular type of traveler does not have priority, instead all travelers are weighted equally regardless of their mode of conveyance but based on their speed. This means that there is little benefit of running the app while driving a detected motor vehicle as it provides little, if any, additional priority.

In a still further embodiment, attempts to abuse the system can also Ire thwarted by evaluating criteria of the user approaching the intersection. For example, pedestrians generally have a limited expected speed below the expected speed of a bicyclist, which is below the expected speed of a motor vehicle. These differences can be used to classify detected travelers for purpose of weighting their expected mode of conveyance differently. Similarly, differences in vibration (e.g. engine vs. road vibration) or acceleration can be used to detect what type of conveyance the traveler is using.

The system may also provide for users to utilize the same app, but have different priority based on their current activity. For example, a user may be treated the same as any other. However, when they board a municipal vehicle (for example a snowplow) the interaction of the software app on their mobile communication device (101), and the vehicle's identifier system may create a different value in the priority ladder for the combination. For example, in this situation, a snowplow and driver may have priority 2 while the driver is only a single standard user at priority 4 in any other vehicle and the snowplow with a different driver (one who does not operate it in snowy conditions) may also have priority 4. This ability to detect that an individual's device is within a particular vehicles (usually of a particular type) can provide for yet an additional level of priority granularity by providing signal combinations of a particular pattern greater priority than the signals independently. As a good example, an individual riding on a bicycle identified with the police may have increased priority over the same individual riding on a motorcycle not so associated.

Similarly, vehicles may be able to identify the number of passengers utilizing interactions. For example, a bus may be able to detect the number of signals from the individuals on hoard and then collect and coalesce those signals into a single "super" signal which acts to identify the bus as both a single vehicle, and as a transport for a large number of signals, in this way, fall buses may be given increased priority to allow them to go express and reach more distant destinations quicker while still not disrupting pickups at later stops, Similarly, a delivery truck could also be provided with different forms of priority. It may be the case that a city wants to have delivery trucks on the street at only specific times to provide for improved traffic flow (for example, early in the morning). During this time, the truck could be given a very high priority to allow it to get around quickly, while once this window is passed, the tracks priority may lower to being the same as any other vehicle. A similar situation could be used for garbage collection vehicles or other vehicles which commonly utilize roads when they are less congested. These vehicles could be provided with a very high priority to assist in them getting jobs done and the vehicles off the road during these hours where less congestion already exists.

In a yet further embodiment, the system can also be designed to improve the efficiency of vehicle pickups or of self-driving vehicles not carrying any individuals, hi these cases, the number of travelers detected at any intersection is actually smaller than the number of travelers effected by the speed of the vehicle in reaching its destination. A taxi-cab driving to, pick up a fare, for example, is more efficient if it is on time. Thus, the system may give an extra priority count to a taxi-cab that has indicated it is driving to pick up a passenger. When the passenger eaters, this "bonus" traveler is eliminated in favor of the number of travelers actually in the vehicle. Similarly, a bus may be given priority based on the number of potential riders detected at bus stops it will visit later in its route.

A similar type of "bonus" traveler can be provided in other circumstances. For example, a self-driving vehicle not operated by a human user may be allowed to transmit that it comprises a single traveler, so long as it actually has no travelers present. In this way, an automated delivery truck, for example, would not be stuck at an intersection as not being detected since it contains no travelers, but it is desirable to move it efficiently. This bonus could be eliminated if the vehicle actually includes a traveler (e.g. a passenger) as this allows the autonomous vehicle to be detected. These "bonus" travelers can also be given different priority to more standard human travelers. Thus, an automated delivery truck may have the lowest priority of any vehicle as it cannot get impatient and violate a light, for example, but will still be allowed to go at some time to keep it from being largely delayed.

This final concept is worth discussing as it was also mentioned previously. While the above systems and methods are deigned to improve overall efficiency, it should be recognized that it will be necessary at some times to sacrifice maximized efficiency of the system in favor of making sure that there is some equality of waiting. For example, if a priority system always favored a large group over a single driver, an individual attempting to cross a very busy road may never be able to cross as an individual traveler may always be less than the number of travelers in the detection zone of the cross street. For this reason, it is also generally preferred that the system have a maximum allowed wait time for any traveler and that the system allow that traveler to go before that maximum time is reached even if this scarifies maximum efficiency. This maximum prevents a frustrated traveler from disobeying the signal that they cannot seem to change because of the system (one of the things the system is actually designed to prevent in the first place) and still provides a measure of equality to all travelers and their needs.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for assisting a traveler through an intersection, the method comprising:

a traveler carrying a mobile communication device, said mobile communication device being configured to transmit its location and direction of travel information;

said traveler commencing use of a mode of transportation while still carrying said mobile communication device;

determining said mode of transportation of said traveler;

evaluating said location and direction of travel information to determine if said traveler is approaching an intersection;

if said traveler is approaching said intersection, assigning a priority to said traveler for said traveler go through said intersection based at least in part on said determined mode of transportation of said traveler; and altering a traffic signal at said intersection based on said assigned priority.

2. The method of claim 1, wherein said mobile communication device only transmits said direction of travel information if said mobile device is in a preselected detection zone proximate said intersection.

3. The method of claim 1, wherein said direction of travel information comprises the direction that said mobile communication device is moving.

4. The method of claim 1, wherein said direction of travel information comprises the direction that said mobile communication device is pointed.

5. The method of claim 1, wherein said direction of travel information comprises a direction indicated on said mobile communication device.

6. The method of claim 1, wherein said mode of transportation is an autonomous vehicle.

7. The method of claim 1, wherein said mode of transportation is a bicycle.

8. The method of claim 1, wherein said mode of transportation is a personal mobility device.

9. The method of claim 1, wherein said mode of transportation is a motor vehicle.

10. The method of claim 1, wherein said determining a mode of transportation for said traveler comprises determining whether said traveler is a pedestrian or is aboard a vehicle.

11. The method of claim 10, further comprising determining a type of vehicle said traveler is aboard if said each traveler is determined to be aboard a vehicle.

12. The method of claim 11, wherein said assigned priority is a higher priority if said determined mode of transportation is selected from the group consisting of: a carpool vehicle, a mass transit vehicle, a municipal vehicle, and an autonomous vehicle.

13. The method of claim 1, wherein said determining a mode of transportation for said traveler is based at least in part on said location and direction of travel information.

14. The method of claim 1, wherein said determining a mode of transportation for said traveler is based at least in part on observed speed information related to said traveler.

15. The method of claim 1, wherein said determining a mode of transportation for said traveler is based at least in part on observed acceleration information related to said traveler.

16. The method of claim 1, wherein said determining a mode of transportation for said traveler is based at least in part on observed vibration level information related to said mobile communication device.

17. The method of claim 1, wherein said assigning a priority to said traveler for said traveler to go through said intersection is based at least in part on said location and direction of travel information.

18. The method of claim 1, wherein said determining uses information received from a vehicle.

19. The method of claim 18, wherein said vehicle is an autonomous vehicle.

20. The method of claim 1, wherein said determining uses information from an app stored on said mobile communication device.

* * * * *